1,810,159

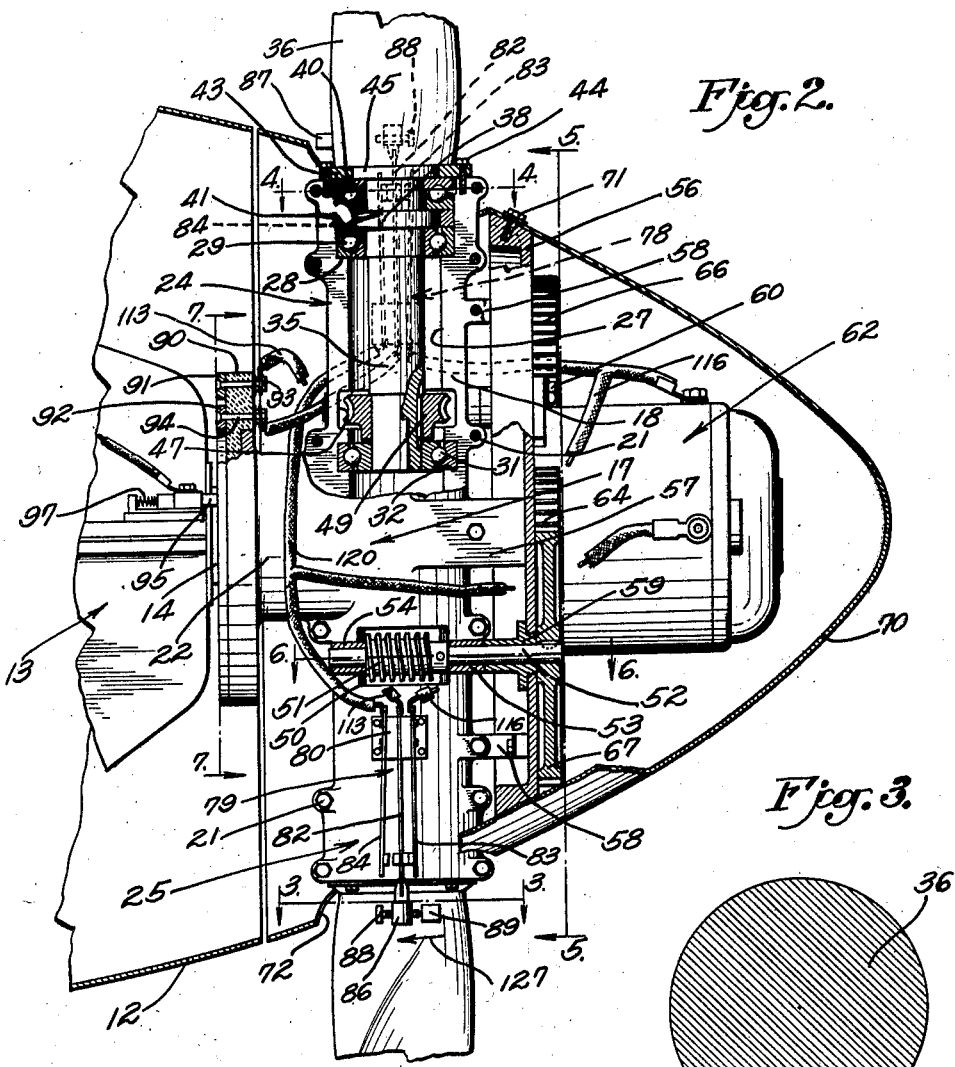
Fig. 2.
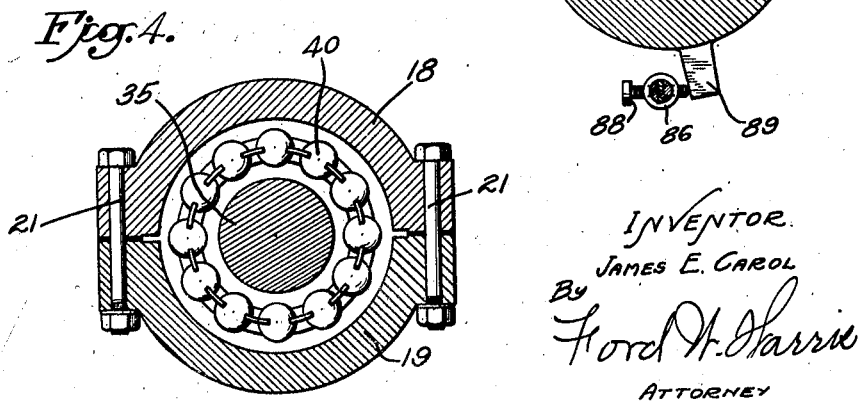
Fig. 3.
Fig. 4.
INVENTOR.
JAMES E. CAROL
By Ford H. Harris
ATTORNEY June 16, 1931. J. E. CAROL 1,810,159
AUTOMATIC PROPELLER CONTROL
Filed Oct. 3, 1927   3 Sheets-Sheet 3
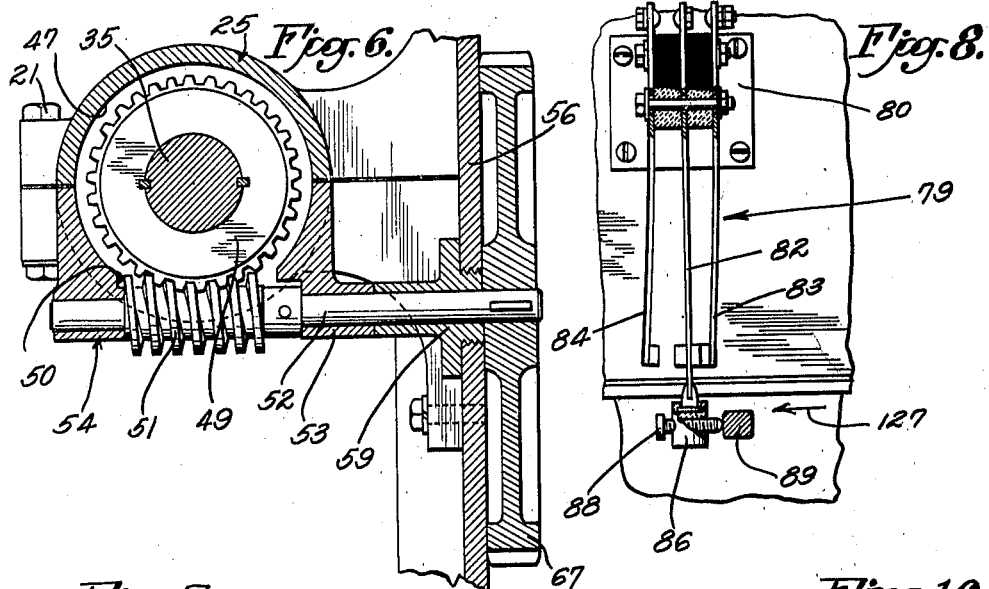
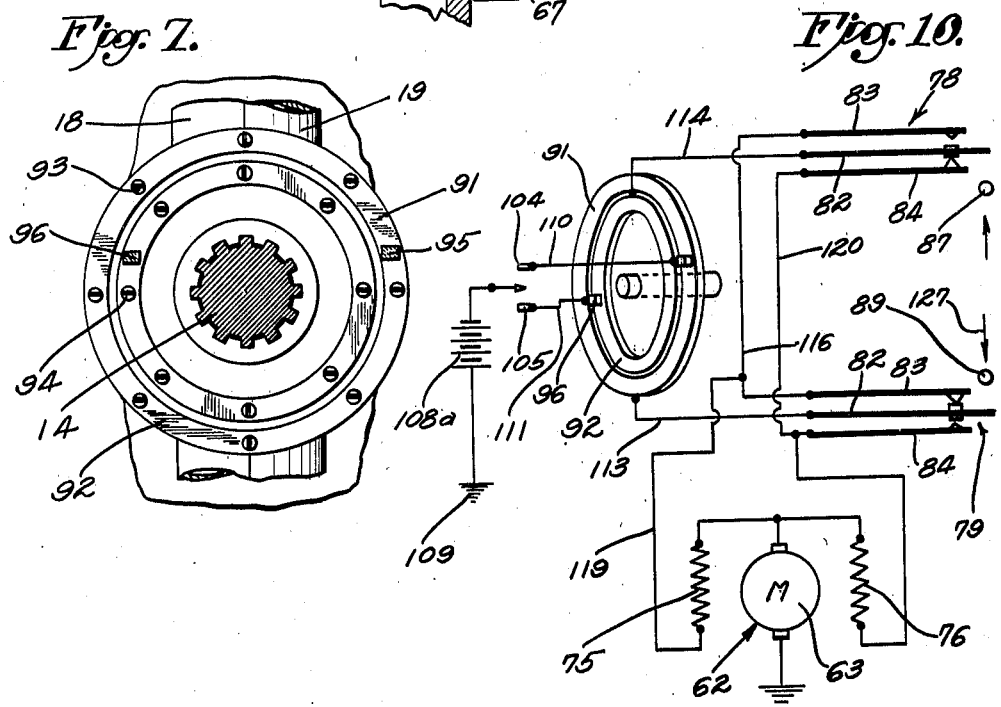
INVENTOR
JAMES E. CAROL
By Ford W. Harris
ATTORNEY Patented June 16, 1931

UNITED STATES PATENT OFFICE

JAMES E. CAROL, OF LOS ANGELES, CALIFORNIA, ASSIGNOR OF ONE-THIRD TO BYRON D. HAMMONS AND ONE-THIRD TO WILLIAM W. JONES, BOTH OF LOS ANGELES, CALIFORNIA

AUTOMATIC PROPELLER CONTROL

Application filed October 3, 1927. Serial No. 223,612.

My invention relates to propellers, and more particularly to an airplane propeller the pitch of which is adjustable by an electric motor.

Certain types of airplane propellers have been devised and used in which the blades are adjustable to vary the pitch of the propeller. In one type, this varying of pitch is accomplished only when the propeller is stationary, in another type, the pitch of the propeller may be changed during flight. My invention relates to the latter type, but is equally effective when the propeller is stationary.

Types of variable-pitch propellers adjustable in flight have in the past been operated by mechanical means connecting a lever in the cockpit of the airplane with the rotating blades. Large frictional forces are always present in such a mechanical device operating between a stationary and a rotatable member, and in operating the propeller, the pilot is required to take one hand from his controls to operate the pitch-varying lever. Not only is this lever hard to move, but the pilot's attention must be momentarily removed from his flight. It is often desirable to reverse the pitch of the propeller when landing, in order to bring the plane to a quick stop. Anything detracting the pilot's attention at such a moment might easily prove disastrous, and if the pitch of the propeller is to be reversed it is essential that the controls regulating this reversal be easily operated without removing the hands from the controls, and that the action on the propeller blades be positive and quick acting.

It is an object of my invention to provide a propeller, the pitch of which may be easily controlled during flight.

I prefer to use an electric motor to vary the pitch of the propeller, said motor normally rotating with the propeller.

It is an object of my invention to provide a variable-pitch propeller operable by an electric motor.

I operate and control said motor from the cockpit of the airplane, the circuits through the motor being operable without removing the hands from the controls of the plane.

It is another object of my invention to provide a propeller, the pitch of which may be varied by the pilot without removing his hands from the controls.

It is desirable that the operator be able to change the pitch in small degrees or to throw the blades into a maximum forward or reverse position.

Another object of my invention is to provide a propeller, the pitch of which is variable in small degrees, or which may be quickly thrown into a maximum forward or reverse position.

Another object of my invention is to provide a variable-pitch propeller operable by a switch, the direction of throw of said switch determining the direction of change of the propeller pitch, and the length of time of depression determining the amount of change of propeller pitch.

Another object of my invention is to provide a variable-pitch propeller, the blades of which are rigidly locked in position at any desired position.

In the absence of a device indicating to the pilot the exact pitch of his propeller, it is essential that predetermined maximum forward and reverse positions should not be exceeded, otherwise the result desired might not be achieved, or even reversed. A suitable stopping device must therefore be used, this stopping device determining the maximum forward or reverse positions of the blades of the propeller.

It is an object of my invention to provide a variable-pitch propeller having a positive acting device for stopping the blades in a maximum forward or reverse position.

Another object of my invention is to use the pitch-changing motor for thus stopping the blades.

A further object of my invention is to provide a propeller, the pitch of which may be varied between adjustable limits.

Other objects of my invention reside in the particular construction of the propeller.

Still further objects and advantages will be made evident hereinafter.

Referring to the drawings in which are shown a preferred form of my invention,

Fig. 2 is a vertical sectional view illustrating the mechanism of my invention.

Fig. 3 is a sectional view of a blade of my invention taken along the line 3—3 of Fig. 2.

Fig. 4 is a sectional view of one of the bearings of my invention taken along the line 4—4 of Fig. 2.

Fig. 5 is a sectional view showing a portion of the gearing of my invention, this view being taken along the line 5—5 of Fig. 2.

Fig. 6 is a sectional view of another section of the gearing of my invention, this view being taken along the line 6—6 of Fig. 2.

Fig. 7 is a view taken along the line 7—7 of Fig. 2.

Fig. 8 is an enlarged view of one of the switches of my invention.

Fig. 9 is a sectional view showing the upper end of a "joy stick" with the control switch of my invention mounted therein.

Fig. 10 is a wiring diagram of my invention.

Figure 1:
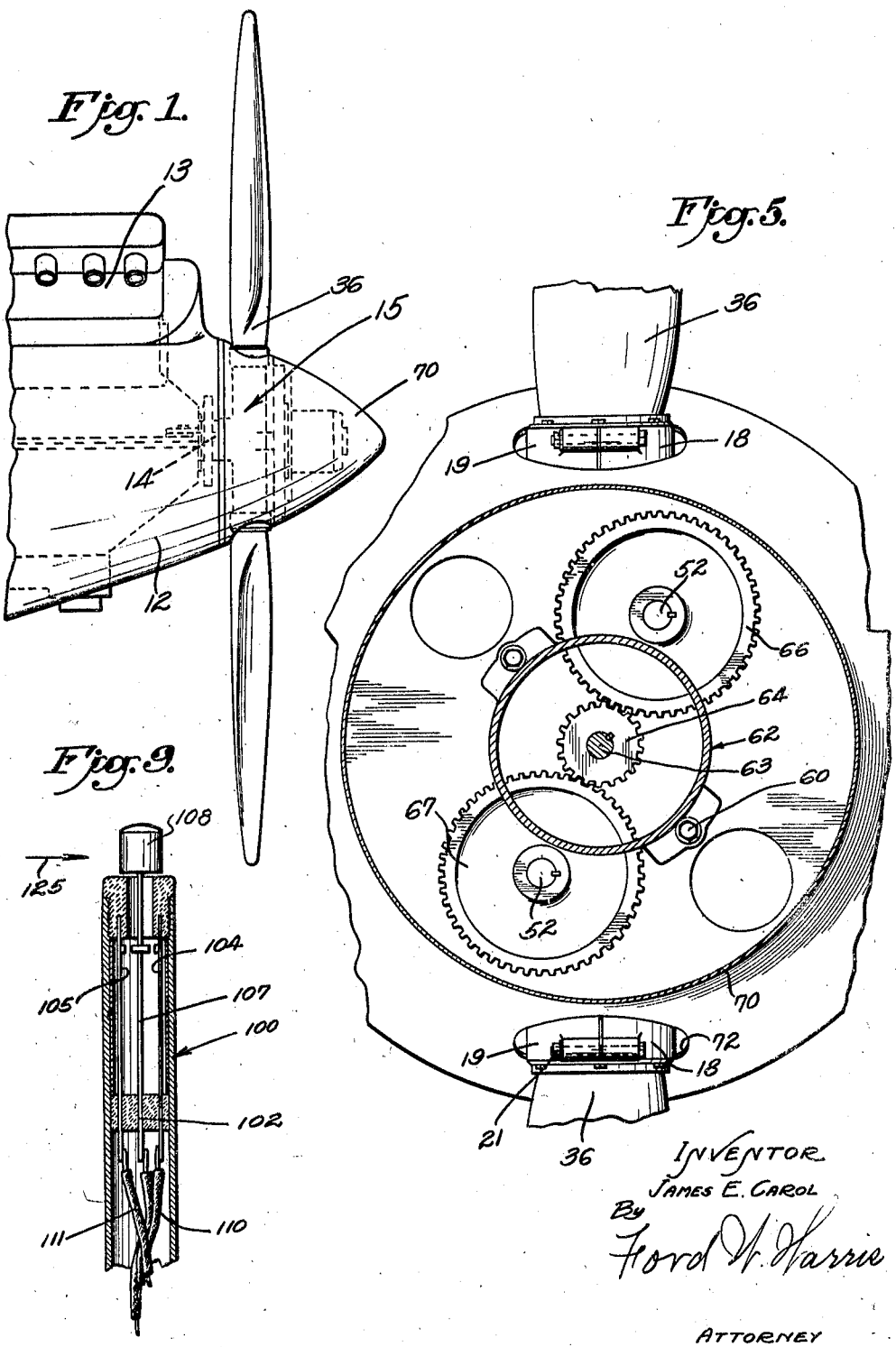
Fig. 1 is a side view of the nose of an airplane embodying my invention.

Referring in particular to Fig. 1, an airplane fuselage 12 is shown as having an engine 13 mounted in the forward nose thereof. Rigidly secured to a crankshaft 14 of the engine 13 is a variable-pitch propeller 15 of my invention.

As best shown in Figs. 2, 4, and 7, my propeller has a shank 17 made of two identical castings 18 and 19, these castings being bolted together by bolts 21. The shank 17 is splined to the crank-shaft 14, as best shown in Fig. 7. The shank 17 comprises a hub portion 22 with primary and secondary sockets 24 and 25 extending outward therefrom. The propeller shown in the drawings has but two blades, but this number is not essential to my invention.

Each of the sockets 24 and 25 has a bore 27 extending radially therein. The outer end of each bore 27 is counterbored as at 28 to receive a radial bearing 29. A similar radial bearing 31 is secured in a chamber 32 in the bore of each socket.

Adapted to journal in the bearings 29 and 31 of each socket is a pin 35 of a propeller blade 36. Each pin has a collar 38 secured thereto, this collar being adapted to fit between the bearing 29 and a thrust bearing 40 also mounted in the counterbore 28. An annular insert 41 lies between the bearing 29 and the thrust bearing 40, and these three members are held in the counterbore by means of a washer 43 secured to the outer end of the socket by bolts 44. The washer 43 surrounds a collar 45 of the blade, but is not adapted to journal the blade. Any inward radial thrust is taken by the bearings 29 and 31, while the large outward radial thrust when the propeller is rotating is taken by the thrust bearing 40. All of these bearings are designed with the end in view of allowing the blades 36 and the pins 35 to freely turn in the bore 27 of the sockets 24 and 25. The position of the blades relative to the sockets determines the pitch of the propeller.

Rotatable in a chamber 47 of each socket is a worm gear 49 which is keyed to the pin 35 which extends into that socket. Adapted to mesh with each worm gear 49, through an opening 50 of each socket, are worms 51 mounted on auxiliary shafts 52. The auxiliary shafts 52 in this embodiment are axially aligned with the crank-shaft 14. These auxiliary shafts are each journalled in bosses 53 and 54 situated respectively in front of and behind the opening 50. Each worm 51 and its attached auxiliary shaft is kept from axial movement by the bosses 53 and 54, but is permitted to freely rotate therein and pivot the blades in their respective sockets in a manner to change the pitch of the propeller. The worm 51 has only a small lead, so that it is impossible to reverse this motion; in other words, it is impossible to turn the auxiliary shafts 52 by means of the blades 36. Thus, when in any position, the blades are automatically locked in that position until such a time as the auxiliary shafts are rotated.

Rigidly secured to the shank 17 is a front plate 56. This attachment is effected through a central boss 57 and outer brackets 58 extending frontward from the shank. Bushings 59 screwed into this front plate journal the auxiliary shafts 52. Secured to the front plate 56 by bolts 60 is a motor 62. The motor 62 has an armature or rotor 63 which is axially aligned with the crank-shaft 14. This rotor 63 carries a pinion 64 which meshes with primary and secondary gears 66 and 67 which are rigidly keyed to the auxiliary shafts. This gearing is best illustrated in Fig. 5. The motor 62 thus normally revolves with the propeller 15, but any rotation of the rotor 63 relative to the rotation of the propeller will cause the auxilliary shafts 52 to rotate and thus change the pitch of the propeller.

A spinner 70 is secured to the front plate 56 by bolts 71. Holes 72 in this spinner allow the blades 36 to extend therethrough. The spinner is adapted to protect the motor and gearing, and also to lower the wind resistance of the propeller structure.

For the sake of simplicity of connections, I prefer to use a motor having two identical field windings 75 and 76 which are so wound as to be opposed in polarity. The motor 62 must be reversible and yet controllable from the cockpit of the airplane. By connecting both fields to the same armature brush and grounding the remaining armature brush to the metal frame of the airplane through the crank-shaft 14, the fields may be alternately energized to reverse the motor. This hook-up of the motor is clearly shown in Fig. 10, from which it will be noted that either field may be placed in series with the rotor. Such a series connection gives a very high torque, especially at start, which is a very desirable feature in this installation.

Primary and secondary switches 78 and 79 are mounted on the primary and secondary sockets 24 and 25 respectively. As best shown in Figs. 2 and 8, each of these switches has a block of insulating material 80 secured to the sockets. Mounted in this insulating material block 80 are three spring arms, the central one being a blade 82 which is adapted to make contact with either a forward contact spring 83 or a reverse contact spring 84, which constitute the outer spring arms. These spring arms may be easily bent to adjust them. The arms of the primary switch should be so adjusted that the blade 82 normally contacts the reverse contact spring 84. In breaking this contact, a point should be reached where the blade contacts neither of the contact springs. Still further movement should bring the blade into contact with the forward contact spring 83. Similarly, the bade 82 of the secondary switch 79 should normally contact the forward contact spring 83 of that switch, but should be movable into an open circuit position and should contact the reverse contact spring 84 on further movement. The object of these switches will be made evident hereinafter.

The outer end of each blade 82 has an insulated portion 86 attached thereto. An adjusting screw 88 is tightly threaded through this insulated portion and is adapted to make contact with a pin 89 projecting from the adjacent propeller blade 36, as best shown in Fig. 3. As the blade 36 turns in its socket, the pin 89 engages the end of the screw 88 and pushes the blade 82. It should be understood that at the instant the pin 89 contacts the screw 88 of the secondary switch 79, the pin 87 on the primary blade reaches its maximum position away from the screw 88 of the primary switch. The primary and secondary switches are adapted to determine the maximum forward and reverse positions of the propeller blades, and they are actuated individually when these maximum positions have been reached. Thus, in the position shown in Fig. 2, the maximum forward position pitch is just being reached, and the pin on the primary propeller blade 36 is not engaging the blade 82 of the primary switch. When the propeller reaches its maximum reverse pitch, this pin on the primary propeller blade will be bearing against the primary switch blade 82, and the pin on the secondary propeller blade will be in a free position.

To that end of the propeller shank which is adjacent to the engine 13 is secured an insulated plate 90. An outer and an inner slip ring 91 and 92 respectively are secured to this insulated plate by bolts 93 and 94. Brushes 95 and 96 are adapted to be pressed by springs 97 into contact with the slip rings 91 and 92 respectively.

Fig. 9 shows the upper end of a joy stick 100 of the airplane. The usual function of such a joy stick is to operate the elevators and ailerons of the plane, and the pilot must constantly hold this joy stick in a desired position. Mounted in the upper end of the joy stick is a control switch 102 having forward and reverse contacts 104 and 105 respectively. A central blade 107 has an insulated thumb rest 108 which is adapted to throw the central blade 107 into contact with either the forward or reverse contacts 104 and 105 for starting the motor 62 in a forward or reverse direction to vary the pitch of the propeller in a manner to be described. When the thumb rest 108 is not engaged by the pilot's thumb, the central blade 107 returns to an upright disengaged position.

The electrical connections of my invention are as follows:

The central blade 107 of the control switch 102 is connected to one terminal of a storage battery 108ª, the other terminal of this battery being grounded to the metal frame of the plane, as indicated at 109. The forward and reverse contacts 104 and 105 are connected by wires 110 and 111 to the brushes 95 and 96 respectively. The slip rings 91 and 92, against which these brushes bear, are connected by wires 113 and 114 to the blades 82 of the secondary and primary switches 79 and 78 respectively. The forward contact spring 83 of the secondary switch 79 is connected by a wire 116 to the forward contact spring 84 of the primary switch 78. A wire 119 connects the free terminal of the field 75 to the wire 116, the remaining terminal of this field being connected to one brush of the armature 63, as previously mentioned. The reverse contact spring 84 of the secondary switch 79 is connected to the reverse contact spring 84 of the primary switch 79 by a wire 120. A wire 122 connects the wire 120 to the free terminal of the field 76, the remaining terminal of this field being connected to one brush of the armature 63 as previously described.

The operation of my invention may best be understood by referring to Fig. 10. Here the pins 89 of the blades are indicated diagrammatically and in describing their operation, they will be referred to as primary and secondary pins, contacting respectively the primary and secondary switches 78 and 79. As shown in Fig. 10, these pins will move in identical directions. Their movement on the actual propeller has been previously described.

Assuming that the propeller pitch is zero, neither of the pins 89 will be in contact with the primary or secondary switches 78 and 79. This position is shown in Fig. 10. If the pilot wishes to increase the pitch so as to pull the plane forward, he pushes the thumb rest 108 forward, as indicated by the arrow 125 of Fig. 9. A circuit is then formed from the battery 108$^a$, through the blade 107, the forward contact 104, and the wire 110 to the brush 95 whence the current travels through the slip ring 91 and the wire 113 to the blade 82 of the secondary switch 79. At this time this blade is in contact with the forward contact spring 83 and current thus passes to the field 75 through the wires 116 and 119. After passing through the field the current is sent through the armature and returns to the battery through the metallic frame of the plane. At this time the motor 62 is energized in such a forward direction as to move the pins 89 in the direction of the arrows 127 of Figs. 2, 8 and 10. This motion is continued until the pilot allows the thumb rest 108 to assume a neutral position, or until the pin 89 of the secondary blade 36 comes into contact with the adjusting screw 88 of the secondary switch 79. In the latter case, the blade 82 breaks contact with the forward contact spring 83, at which time the motor 62 coasts. While thus coasting, the pin 89 pushes the blade into contact with the reverse contact spring 84 which closes a circuit through the wire 122 and the field 76, the circuit from the battery 108$^a$ to the blade 82 being the same as previously described. This tends to reverse the motor, due to the manner of winding the fields 75 and 76, thus not only quickly stopping the motor but actually rotating it in a reverse direction. When thus rotating, the pins 89 are moved in a direction opposite to the arrows 127 until the contact between the blade 82 and the reverse contact spring 84 of the secondary switch 79 is broken, at which time the motor stops and the blades of the propeller are in a maximum forward-pitch position. In this position the blade 82 of the secondary switch 79 contacts neither the forward nor the reverse contact springs 83 or 84. When in this position, any movement of the thumb rest 108 in the direction of the arrow 125 will have no tendency to rotate the armature of the motor 62.

By using such a hook-up, I have found that the motor itself in combination with the proper switches makes a very effective dynamic stopping arrangement or brake which is incorporated in the propeller itself and which prevents the blades from being turned too far. I have found that any positive-acting mechanical stop either jams or is quickly destroyed, due to the coasting action of the armature of the motor and the reduction gearing between the armature and the propeller blades. It is necessary to carefully adjust the contacts of the switch 79 in order to make the apparatus most effective and to have the blade 82 stop at an intermediate position when the propeller blades are in a maximum position, but once adjusted the dynamic stop is entirely satisfactory.

In the event that the pilot should desire to decrease, or completely reverse, the pitch of the propeller, he will push the thumb rest 108 in a direction opposite to the arrow 125 of Fig. 9, holding the blade 107 in contact with the reverse contact 105. This completes a circuit, similar to the one previously described, from the battery 108$^a$, the inner slip ring 92, the blade 82 of the primary switch 78 which is at this time in contact with the reverse contact spring 84 of the primary switch, the field 76, the armature, and the frame of the plane. This energizes the field 76 and causes the motor 62 to operate in a reverse direction, thus turning the blades in such a direction that the pins 89 move in a direction opposite to that indicated by the arrow 127. This movement continues until the pilot releases the thumb rest 108, or until the pin 89 on the primary propeller blade breaks contact with the reverse contact spring 84 of the primary switch 78. The motor then coasts until this pin pushes the blade 82 into contact with the forward contact spring 83. This quickly stops the motor and momentarily operates it in a forward position with just sufficient force to leave the blade 82 disengaged, the propeller at this time having its maximum reverse position. Further movement of the thumb rest 108 in a direction opposite to the arrow 125 will cause no movement of the armature, but a movement in the direction of this arrow will cause the motor to operate to turn the blades toward their maximum forward-pitch position as previously described.

It should thus be apparent that if the propeller blades are in any position between their maximum forward and reverse positions, the pilot may vary the pitch in either direction, depending upon the throw of the thumb rest 108, and that he may change the pitch either a small amount by holding the thumb rest 108 depressed only a short time, or he can throw the blades into a maximum forward or reverse position by continuously depressing the thumb rest 108 until after this maximum position has been reached. It should be further apparent that when in either of these maximum positions the switch 102 is effective only to return the blades to their other maximum position.

When the propeller is rotating at high speeds, it is more difficult to vary the pitch, but inasmuch as a series wound motor is used I have experienced no trouble, because the torque of such a motor varies inversely as the speed so that with a large load the motor will slow down until it will carry the load. It is, of course, within the scope of my invention to use any type of motor for varying the pitch. I have found that the type illustrated is lightest and seemingly best adapted to this use and have so described it.

The maximum forward-pitch position of the propeller 15 is determined by the adjusting screw 88 on the secondary switch 79. By varying the position of this screw, this maximum forward-pitch position can be varied. Similarly the maximum reverse-pitch position may be regulated by the adjusting screw 88 on the primary switch 78.

I claim as my invention:

1. In an airplane, the combination of: an engine; a variable-pitch propeller operated by said engine; a joy stick adapted to operate certain controls on said airplane; and means on said joy stick operable to vary the pitch of said propeller.

2. In an airplane, the combination of: an engine; a variable-pitch propeller operated by said engine; an electric motor adapted to vary the pitch of said propeller; a joy stick adapted to operate certain controls on said airplane; and a switch on said joy stick operable to actuate said motor.

3. In an airplane, the combination of: an engine; a variable-pitch propeller operated by said engine; an electric motor adapted to vary the pitch of said propeller; a joy stick adapted to operate certain controls on said airplane; a switch on said joy stick operable to actuate said motor; and stop means incorporated in said propeller for determining the maximum variation of pitch of said propeller.

4. In an adjustable pitch propeller, the combination of: a rotating shank; blades extending outward from said shank; a motor adapted to vary the pitch of said propeller; and a dynamic stop means for determining the maximum position of said blades.

5. In an adjustable pitch propeller, the combination of: a rotating shank; blades extending outward from said shank; an electric motor adapted to vary the pitch of said propeller; and stop means connected to the electric current of said motor for controlling the maximum position of said blades.

6. In an adjustable pitch propeller, the combination of: a rotating shank; blades extending outward from said shank; a motor adapted to vary the pitch of said propeller; and a brake means on said motor for determining the maximum position of said blades.

7. In an adjustable pitch propeller, the combination of: a rotating shank; blades extending outward from said shank; a motor adapted to vary the pitch of said propeller; and an electric brake means on said motor for determining the maximum position of said blades.

8. In a variable pitch propeller, the combination of: a rotating shank; blades extending outward from and rotatable in said shank; a worm gear mounted directly on each of said blades; an auxiliary shaft adjacent each blade; a worm carried by each of said auxiliary shaft, said worm engaging said worm gear; a motor rotating with said shank, the rotor of said motor being rotatable relative to said shank; means for operating said motor in either direction; and mechanism connecting said rotor and said auxiliary shafts.

9. In a variable pitch propeller, the combination of: a rotating shank; blades extending outward from said shank; a motor rotating with said shank, the rotor of said motor being rotatable relative to said shank; means for operating said motor in either direction; mechanism connecting said rotor and said blades to change the pitch of said blades, said mechanism holding said blades fixed when said rotor is not rotating relative to said shank; and automatic means for stopping said motor when said blades have reached a maximum pitch position.

10. In a variable pitch propeller, the combination of: a rotating shank; blades extending outward from said shank; a motor rotating with said shank, the rotor of said motor being rotatable relative to said shank; means for operating said motor in either direction; mechanism connecting said rotor and said blades to change the pitch of said blades; and means operating as a function of the position of said blades for stopping said motor.

11. In a variable-pitch propeller, the combination of: a rotating shank; blades extending outward from said shank; a reversible electric motor adapted to vary the pitch of said blades; and means for automatically breaking the circuit through said motor when said blades have reached a maximum pitch, said means momentarily sending a reversing current through said motor to quickly stop it when said blades have reached a maximum pitch.

12. In a variable-pitch propeller, the combination of: a rotating shank; blades extending outward from said shank; a reversible electric motor adapted to vary the pitch of said blades; switches carried by said shank, said switches being operable to rotate said motor forward or backward; and means operated by said blades for actuating said switches, said switches and said means being operable to break the circuit to said motor when said blades are in a maximum position and momentarily send a reversing current through said motor to quickly stop it.

13. In a variable-pitch propeller, the combination of: a shank; blades extending outward from said shank; an electric motor operatively connected to said blades to change the pitch thereof; and primary and secondary switches in the control circuit of said motor and actuated by the position of said blades to stop said motor when desired maximum and minimum positions of said blades are attained.

14. A combination as defined in claim 13 in which said primary switch is operated by said blades when in a minimum position and said secondary switch is operated by said blades when in a maximum position.

15. A combination as defined in claim 13 in which said switches are wired in the control circuit of said motor so as to momentarily send a reversing current through said motor when said blades reach either a maximum or minimum position.

16. In a variable-pitch propeller, the combination of: a shank having a plurality of bores therein; a plurality of blades, each blade having a pin extending into one of said bores; a pair of radial bearings in each bore adapted to journal said pins in their respective bores; a thrust bearing in each bore and adapted to take the outward thrust of said blades; and control means connected to all of said blades to simultaneously turn said blades in said bores.

17. A combination as defined in claim 16 in which a worm gear is secured to each of said pins between said radial bearings and also including worms meshing with said worm gears, said worms being simultaneously operable to change the pitch of said blades, said worms and said worm gears comprising a substantially irreversible mechanism so that the twisting torque on said blades will not move said worms.

18. In an airplane, the combination of: an engine; a variable-pitch propeller rotated by said engine; controls for said airplane, said controls being manually engaged by the pilot; and means controllable by said pilot without relinquishing manual engagement with said controls for changing the pitch of said propeller.

In testimony whereof, I have hereunto set my hand at Los Angeles, California, this 26th day of September, 1927.

JAMES E. CAROL.